(12) United States Patent
Torfs et al.

(10) Patent No.: US 7,161,676 B2
(45) Date of Patent: Jan. 9, 2007

(54) METHOD FOR DESIGNING A PLASTIC ARTICLE HAVING A DESIRED APPEARANCE

(75) Inventors: Jan C. Torfs, Terneuzen (NL); Cornelis F. J. Den Doelder, Terneuzen (NL); Eduardus L. L. Broekaart, Nieuw-Namen (NL); Evelien M. Dedeyne, Ghent (BE); Patrick A. Carey, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 225 days.

(21) Appl. No.: 10/514,097

(22) PCT Filed: Apr. 21, 2003

(86) PCT No.: PCT/US03/12390

§ 371 (c)(1),
(2), (4) Date: Nov. 10, 2004

(87) PCT Pub. No.: WO03/105029

PCT Pub. Date: Dec. 18, 2003

(65) Prior Publication Data

US 2005/0146722 A1    Jul. 7, 2005

(51) Int. Cl.
*G01J 3/46* (2006.01)

(52) U.S. Cl. .......................... 356/402; 356/425
(58) Field of Classification Search ........ 356/402–405, 356/421–425, 408, 419, 58–59; 703/1–28; 162/263, 198; 702/188
See application file for complete search history.

(56) References Cited

U.S. PATENT DOCUMENTS

| | | | | |
|---|---|---|---|---|
| 4,479,718 A | 10/1984 | Alman | ................. | 356/405 |
| 4,711,580 A | 12/1987 | Venable | ................. | 356/406 |
| 4,812,904 A | 3/1989 | Maring et al. | ............. | 358/107 |
| 4,917,495 A | 4/1990 | Steenhoek | ................. | 356/328 |
| 5,082,529 A * | 1/1992 | Burk | ................. | 162/198 |
| 5,231,472 A | 7/1993 | Marcus | ................. | 356/402 |
| 5,740,078 A | 4/1998 | Cheetam et al. | ............ | 364/526 |
| 5,841,421 A | 11/1998 | Cheetam et al. | ............ | 345/150 |
| 6,108,095 A | 8/2000 | Graf | ................. | 356/425 |
| 6,788,413 B1 * | 9/2004 | Torfs et al. | ................. | 356/408 |
| 7,069,186 B1 * | 6/2006 | Jung et al. | ................. | 702/188 |

FOREIGN PATENT DOCUMENTS

| | | |
|---|---|---|
| DE | 4243885 | 12/1992 |
| GB | 1103950 | 2/1968 |
| JP | 62149760 | 12/1985 |
| JP | 63081134 | 9/1986 |
| JP | 04314645 | 4/1991 |
| WO | WO00/63818 | 10/2000 |

OTHER PUBLICATIONS

J.L. Saunderson, J. Optical Soc. of America, vol. 32, 12, pp. 727-736.
International Commisison On Illumination, Colorimetry, Second Edition, Publication CIE No. 15.2, 1986.
E. N. Dala & K. M. Natale-Hoffman, The Effect of Gloss on Color, vol. 24, No. 5, 1999.

* cited by examiner

*Primary Examiner*—Layla Lauchman
*Assistant Examiner*—Tri Ton
(74) *Attorney, Agent, or Firm*—Steven W. Mork

(57) ABSTRACT

The present invention provides a method for designing a plastic article having a desired appearance. The process includes having a desired appearance and then obtaining fabrication parameters from the set of virtual article parameters. The present invention can include steps for characterizing an appearance of a target article (target article appearance) and then fitting virtual article parameters to the target article appearance.

13 Claims, 3 Drawing Sheets

METHOD FOR DESIGNING A PLASTIC ARTICLE HAVING A DESIRED APPEARANCE

This invention relates to a method for designing a plastic article having a desired appearance.

Plastic articles are common place in the world today. Plastic parts offer fabricators versatility in manufacturing articles of differing size, shape, and appearance at a relatively low cost.

Plastic parts have an appearance that depends on how the human eye perceives a combination of the object's color and surface texture. An article's surface texture can play a critical role in the article's appearance. For example, surface texture properties can cause the appearance of a single article to be different upon viewing or illuminating at different angles.

Designing and manufacturing a plastic article with a desired appearance can be a challenging and costly endeavor. Many current design methods consider color contributions to appearance without considering surface texture contributions. Typically, an iterative process of fabricating an article and then modifying fabrication parameters and fabricating another article is necessary in order to define fabrication parameters suitable to achieve an article with a desired appearance. Fabricating articles that do not have an adequate appearance costs both time and money. It is desirable to minimize the cost and effort needed to design and manufacture a plastic article with a desired appearance while at the same time design an article that has a desired appearance under various lighting and viewing conditions.

In a first embodiment, the present invention is a method for designing a plastic article comprising the steps: (a) generating from a set of virtual article parameters a virtual article having a desired appearance with sufficient detail to reveal internal color and surface reflectance components of the appearance, including appearance due to micro surface texture, under more than one combination of illumination and viewing angles; wherein the virtual article parameters are sufficient for defining fabrication parameters; and (b) identifying fabrication parameters from the set of virtual article parameters.

In a second embodiment, the present invention further comprises at least one step prior to step (a) for characterizing the appearance of a target article having a target appearance and modifying the set of virtual article parameters until they correspond to an article having acceptably similar appearance characteristics to the target article.

In one desirable variation of either the first or second embodiment, step (a) comprises modifying at least one virtual article parameter in the set of virtual article parameters and generating a virtual article from the set of virtual article parameters in an iterative process until a final set of virtual article parameters that generates a virtual article having a desired appearance is identified; and wherein the set of virtual article parameters in step (b) is the final set of virtual article parameters.

It is one object of the present invention to provide a method useful in generating fabrication parameters for an article having a desired appearance at more than one combination of illumination and viewing angles. The method minimizes or eliminates a need for test fabrications in order to determine the fabrication parameters for an article that has a desired appearance.

FIG. (FIG.) 1 illustrates a flow chart for a desirable variation of the first embodiment.

The present invention is a method useful for the design and fabrication of plastic articles that have a desired appearance at more than one combination of illumination and viewing angles (that is, more than one illumination angle, viewing angle, or more than one illumination and viewing angle). Herein, a plastic article includes any article that has an appearance resulting from a plastic surface. For example, a plastic article can consist of a plastic composition. As an alternate example, a plastic article can comprise a metal structure that has a plastic composition surface. Within the alternate example, the present invention is particularly useful in designing the plastic composition surface.

The present invention includes generation of a virtual article that allows examination of an article under various combinations of illumination and viewing angles prior to actually fabricating a physical article. Generate the virtual article from a set of virtual article parameters. Virtual article parameters are sufficient to define a specific type of virtual article (for example, an image on a computer monitor screen or a holographic image) and contain sufficient detail to take into account micro surface texture of an article. Virtual article parameters are adjustable to obtain a virtual article with a desired appearance.

Virtual article parameters are also sufficient for defining fabrication parameters. Fabrication parameters provide suitable information for fabricating a physical article having a similar appearance, desirably a "substantially similar" appearance, to a virtual article generated from corresponding virtual article parameters. Herein, an appearance is "substantially similar" to another appearance if the two appearances look the same to an unaided human eye of an average person (that is, not a person specially trained or skilled at appearance matching).

Virtual article parameters are "sufficient for defining fabrication parameters" if they are a form of fabrication parameters, or can be converted into a form of fabrication parameters with three or fewer, preferably without any trial fabrications. Herein, a trial fabrication refers to a fabrication of an article that has an appearance that is not similar to the desired appearance. The method of the present invention can reduce the time and cost of designing a plastic article having a desired appearance.

An objective of the present invention is to generate fabrication parameters for fabricating a physical article having a "desired appearance". A desired appearance includes physical features such as shape, as well as color and light reflective properties at more than one combination of illumination and viewing angles. Identification of the desired appearance can occur prior to generating a virtual article, while generating a virtual article, or after generating a virtual article.

Figure 1:
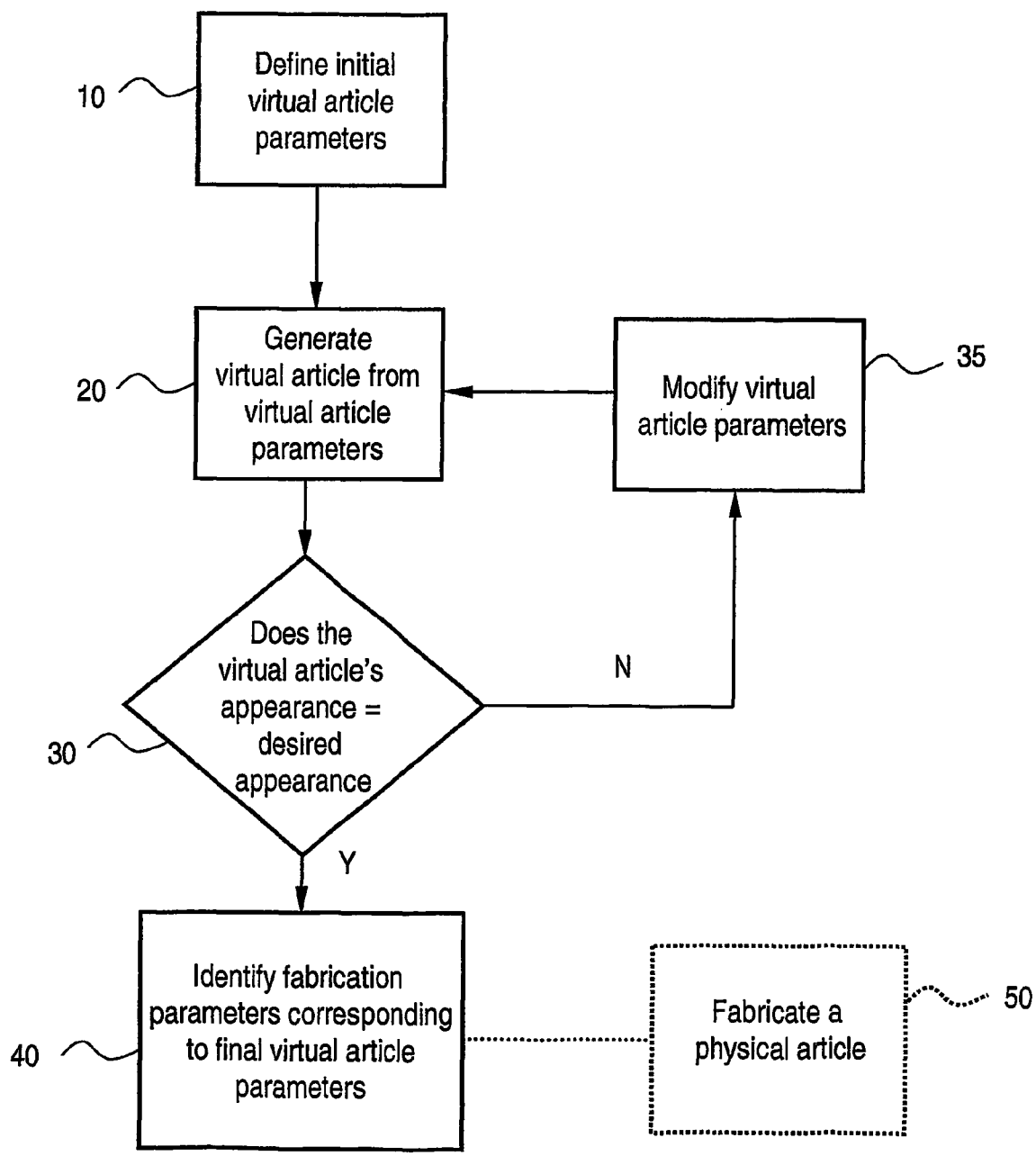

FIG. 1 illustrates a flowchart for a desirable variation of the first embodiment of the present invention. First, define an initial set of virtual article parameters in step 10, and then create a virtual article using those parameters in step 20. The virtual article has sufficient detail to reveal an appearance resulting from internal color and surface reflectance properties, including those reflectance properties due to micro surface texture, under more than one combination of illumination and viewing angles. Evaluate if the appearance of the virtual article has a desired appearance in step 30. If the virtual article does not have a desired appearance, modify at least one of the parameters used to generate the virtual article in step 35 and proceed through steps 20 and 30 again. Repeat steps 35, 20 and 30 as necessary until obtaining a final set of virtual article parameters that generate a virtual article having a desired appearance. In step 40, use the final virtual article parameters to define fabrication parameters for a physical article. Optionally, fabricate a physical article using the parameters in step 40 to generate such a physical article in step 50.

A skilled artisan recognizes that there may be more than one way to accomplish each of these steps, all of which fall under the scope of the present invention. The following approaches for accomplishing each step serve only as examples and do not limit the scope of each step. A skilled artisan also recognizes that additional steps can come before or after any of the cited steps to introduce modifications to the present invention.

The virtual article parameters in step 10 describe an article's internal color and external surface reflectance properties, including reflective properties due to micro surface texture. Virtual article parameters also are in a form sufficient to define or convert into fabrication parameters such as, for example, the article's shape, polymer composition, colorant composition, surface texture and surface roughness. The exact form of the virtual article parameters depends on the algorithm step 20 uses to generate a virtual article. One example of suitable virtual article parameters are a computer assisted design (CAD) file to describe the article shape; absorption coefficient (K), scattering coefficient (S), and concentration (C) for a series of colorants and a desired polymer composition; the index of refraction ($n_r$) for the desired polymer composition; a characterization of an article's macro surface texture; and an indication of micro surface texture effects of surface reflectance.

Macro and micro surface textures differ primarily in the magnitude of their profile features. Macro surface texture includes those surface features that are discernable by an unaided eye and generally comprises a repetitious pattern. Micro surface texture refers to surface features that are not directly observable with an unaided eye. For example, a leather grain pattern is a type of macro surface texture while surface pitting resulting from sandblasting a metal surface is a type of micro surface texture. Generally, characterize a macro surface texture using a topography profile, which is a map of x,y,z coordinates for a section of an article's surface. A macro surface texture is often a repetitious pattern, or nearly repetitious pattern. A topography profile desirably is sufficient to define a repetitious pattern for the macro surface texture. Suitable parameters for defining a micro surface texture are discussed below.

In step 20, generate a virtual image using the set of virtual article parameters from step 10 or step 35. The virtual article is generally an image on a computer screen, but can be any type of image including holographic image or a printed image (for example, a photograph). A form of Maya Complete software (from Alias/Wavefront Seattle) that has been modified to take into account surface reflectance properties at various angles of illumination and viewing is one example of a suitable program for generating a virtual article on a computer screen. The modified Maya Complete software (modified Maya software) uses as input variables: A CAD file to define article shape; red, green, blue (RGB) values to define the article's internal color based on a specific selection of polymer composition and colorants; an image file correlating to a topography profile to define the macro surface texture appearance; parameters defining a surface reflectance term; as well as illumination and observation angles. Desirably, fabrication parameters such as processing temperatures are included in identification of the virtual article parameters. This can be done, for example, as part of defining the surface reflectance parameters as described below.

Define a desired internal color component for an article by specifying, for example, K, S, and C values for a series of colorants and a desired polymer composition. Software programs such as Chromacalc (Datacolor International, Lawrenceville, N.J., USA), Propallete (ECS, Antwerpen, Belgium) or Cygrec (CIBA, Basl, Switzerland) are useful for visualizing the internal color contribution for various colorant and polymer composition combinations. Convert the K, S, and C values for the polymer composition and colorants to RGB values for use in the modified Maya software using standard color theory.

Generate an image correlating to a topography profile that visually represents a macro surface texture of an article characterized by the topography profile. The topography profile can come from, for example, a library of topography profiles or by generating a new topography profile. Generate a new topography profile, for example, by conducting a topography scan of a surface having a desired texture. Topography scanners are commercially available for obtaining topography profiles and include NT Optical Profiler from Veeco, N.Y.; the MicroProf from FRT Bergisch-Gladbach, Germany, and the Wavespeed 1012 from Hommelwerke, Schwenningen, Germany. Desirably, develop a library of topography profiles by collecting the profiles from many different surface textures.

Figure 2:
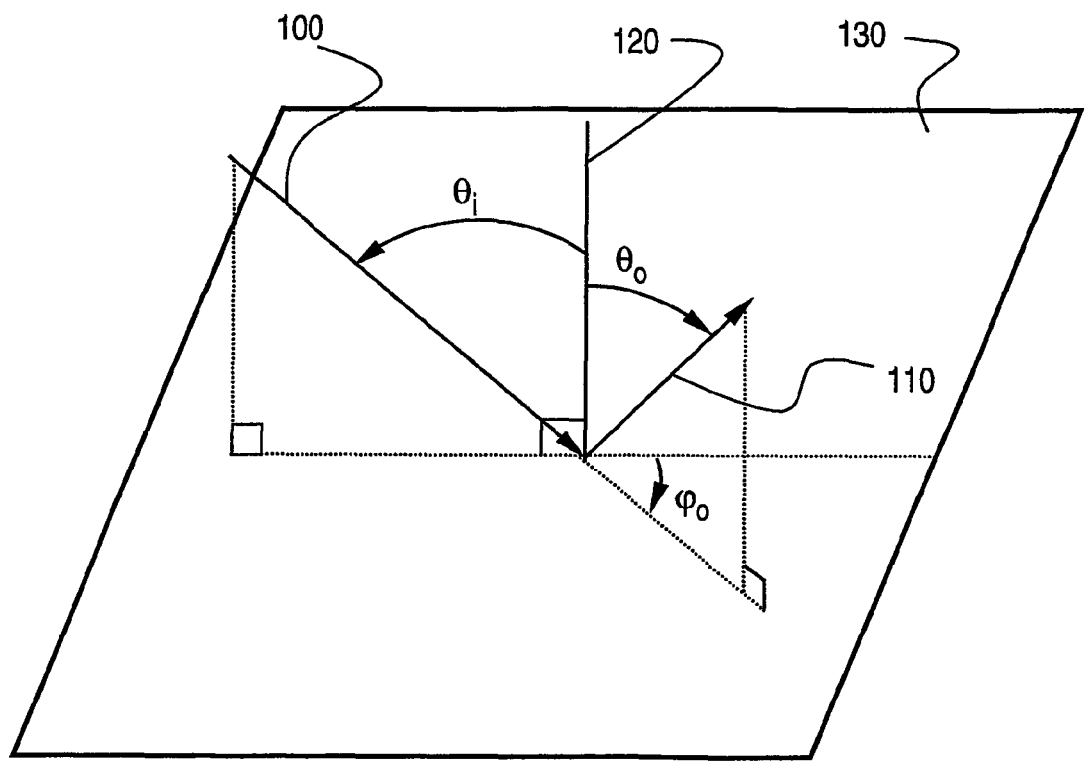
FIG. 2 illustrates illumination and observation angles.

Define illumination and observation angles, for example, by the angle of a light beam illuminating an article relative to a reference normal to the article's surface ($\theta_i$), the angle of observation for a light beam reflected off from an article relative to a reference normal to the article's surface ($\theta_o$), and an angle equal to 180° minus the angle between a projection of the illuminating light beam and a projection of the observed light beam onto a plane defined by the article's surface ($\phi_o$) FIG. 2 provides an illustration of these angles for illumination beam 100, reflected beam 110, reference 120 and article 130.

An article's micro surface texture affects the article's appearance in terms of surface reflectance. Surface reflectance is a measure of light reflected off from an article's surface relative to light incident to an article's surface. Surface reflectance describes external reflectance properties and does not take into account light that penetrates into an article's surface and interacts with the article's composition (that is, polymer and colorant) before reflecting from the article. Surface reflectance is a function of $\theta_i$, $\theta_o$, $\phi_o$ and the wavelength of light, $\lambda$. Surface reflectance can be expressed according to Equation (1), or preferably Equation (2) or (3):

$$k(\theta_i,\theta_o,\phi_o,\lambda)=k_F(\theta_i,\lambda)[c_1(\lambda)+c_2(\lambda)\exp(-f(\theta_i,\theta_o,\phi_o)^2/c_3(\lambda))] \qquad (1)$$

$$k(\theta_i, \theta_o, \varphi_o, \lambda) = \frac{c_1(\lambda)k_F(\theta_i, \lambda)}{(1 + c_2^2(\lambda)f(\theta_i, \theta_o, \varphi_o))^{c_3(\lambda)/2}} \qquad (2)$$

$$k(\theta_i, \theta_o, \varphi_o, \lambda) = k_F(\theta_i, \lambda) \left[ \frac{c_1(\lambda)}{1 + f(\theta_i, \theta_o, \varphi_o)} + \frac{c_2(\lambda)}{(1 + f(\theta_i, \theta_o, \varphi_o))^2} + \frac{c_3(\lambda)}{(1 + f(\theta_i, \theta_o, \varphi_o))^3} \right] \qquad (3)$$

where:

$$f(\theta_i, \theta_o, \phi_o) = \sin^2(\phi_o)\sin^2(\phi_o) + (\sin(\phi_i) - \cos(\phi_o)\sin(\phi_o))^2 + (\cos(\phi_i) - \cos(\phi_o))^2;$$

and $$k_F(\theta_i, \lambda) = \frac{1}{2}\left(\left[\frac{\cos(\theta_i) - \sqrt{n_r^2 - \sin^2(\theta_i)}}{\cos(\theta_i) + \sqrt{n_r^2 - \sin^2(\theta_i)}}\right]^2 + \left[\frac{n_r^2\cos(\theta_i) - \sqrt{n_r^2 - \sin^2(\theta_i)}}{n_r^2\cos(\theta_i) + \sqrt{n_r^2 - \sin^2(\theta_i)}}\right]^2\right).$$

The modified Maya program uses $c_1(\lambda)$, $c_2(\lambda)$, $c_3(\lambda)$ and $n_r$ values to determine a surface reflectance component to the virtual article's appearance, in a manner similar to the ray tracing procedure described below. For clarity, herein $c_1$, $c_2$, and $c_3$ refers to $c_1(\lambda)$, $c_2(\lambda)$, and $c_3(\lambda)$, respectively. The index of refraction term ($n_r$) is that of a polymer composition desired for fabricating a physical article. The $c_1$, $c_2$, and $c_3$ values dictate the reflectance properties off from the surface of an article made of a polymer composition having a specific index of refraction ($n_r$). Identify $n_r$ by selecting the desired polymer composition. Determine $c_1$, $c_2$, and $c_3$ values using a ray-tracing algorithm.

The ray-tracing algorithm first determines how an article's micro surface texture disperses light and then combines the micro surface texture effects with that of the article's macro surface texture. The ray-tracing algorithm accounts for non-reflected light, that which penetrates into the article and does not reflect back out, using classical Fresnel's equations.

The ray-tracing algorithm requires selection of a micro surface texture. One way to select a micro surface texture is by measuring the surface reflectance of a physical sample that is made of the desired polymer composition and that has the selected micro surface texture but is absent of macro surface texture. Make the physical sample under specific processing conditions (for example, molding temperature). Desirably, the physical sample is pure black, that is it absorbs all light that does not reflect off from its surface. For such a case, the reflectance value is the same as the surface reflectance. Alternatively, subtract from the reflectance value the internal color component. The internal color component is a function of polymer composition and specific colorants therein and relates to the reflectance value according to Equation 4:

$$R(\theta_i, \theta_o, \varphi_o, \lambda) = k(\theta_i, \theta_o, \varphi_o, \lambda) + \frac{(1 - k_1(\lambda))(1 - k_2)R_i(\lambda)}{1 - k_2 R_i(\lambda)} \quad (4)$$

wherein:

$R(\theta_i, \theta_o, \phi_o, \lambda)$ is the reflectance value, $k(\theta_i, \theta_o, \phi_o, \lambda)$ is a surface reflectance component, and the remaining term is the internal color component;

$\theta_i$, $\theta_o$, $\phi_o$, and $\lambda$ are as previously defined;

$k_1(\lambda)$ is the fraction of diffuse incident light that reflects from an article's surface, a term known in the art (see, for example, J. L. Saunderson, J. Optical Soc. of America, Vol. 32, 12, pp. 727–736);

$k_2$ is an internal surface reflection coefficient (the fraction of light incident diffusely upon the surface of a sample from inside that is reflected) and is generally considered to be in a range from 0.4 to 0.6, with 0.4 bing a commonly used estimate;

$R_i(\lambda)$ is an idealized reflectance value that can be calculated on the basis of the Kubelka-Munk equation:

$$R_i(\lambda) = 1 + \frac{K_{tot}(\lambda)}{S_{tot}(\lambda)} - \left(\frac{K_{tot}(\lambda)^2}{S_{tot}(\lambda)^2} + \frac{2K_{tot}(\lambda)}{S_{tot}(\lambda)}\right)^{1/2} \quad (5)$$

wherein:

$$K_{tot}(\lambda) = \sum_i^N C_{col_i} K_{col_i}(\lambda) + C_{pol} K_{pol}(\lambda); \quad (6)$$

$$S_{tot}(\lambda) = \sum_i^N C_{col_i} S_{col_i}(\lambda) + C_{pol} S_{pol}(\lambda); \quad (7)$$

$C_{col_i}$ and $C_{pol}$ are the concentrations of colorant i and the polymer composition, respectively;

$K_{col_i}(\lambda)$ and $K_{pol}(\lambda)$ are respectively the absorption coefficients of colorant i and the polymer composing at wavelength %;

$S_{col_i}(\lambda)$ and $S_{pol}(\lambda)$ are the scattering coefficients of colorant i and the polymer composition at wavelength $\lambda$, respectively; and N is the number of colorants.

Use Equations (4)–(7) to calculate the internal color component for each reflectance value. Subtracting the internal color component from the reflectance value provides the surface reflectance for the micro surface texture of the physical sample.

Determine surface reflectance terms for the micro surface texture of the physical sample at more than one combination of illumination and observation angles and more than one visible wavelength to establish an array of micro surface texture surface reflectance terms. The more illumination angles and observation angles and wavelengths used in establishing the array of micro surface texture surface reflectance terms, the more precisely the micro surface texture can be characterized. Generally, the combined number of illumination and observation angles is at least 3 in an array of micro surface texture surface reflectance terms. Generally, use wavelength values of 400 nanometers (nm), 450 nm, 500 nm, 550 nm, 600 nm, 650 nm, and 700 nm to establish the array of micro surface texture surface reflectance terms.

Fit the array of micro surface texture surface reflectance terms to Equation (1), (2) or (3) in order to identify the $c_1$, $c_2$ and $c_3$ terms associated with the micro surface texture contribution to surface reflectance ($c_{1micro}$, $c_{2micro}$, and $c_{3micro}$). Desirably, after selecting Equation (1), (2) or (3), use that equation throughout a method when determining surface reflectance.

An alternative method for selecting a micro surface texture is by selecting $c_{1micro}$, $c_{2micro}$, and $c_{3micro}$ values for a specific micro surface texture from a reference table. A suitable reference table contains $c_{1micro}$, $c_{2micro}$, and $c_{3micro}$ values from multiple physical samples along with the processing conditions for each physical sample. Prepare a suitable reference table by following the above procedure to determine $c_{1micro}$, $c_{2micro}$, and $c_{3micro}$ values for multiple specific micro surface textures. Desirably, add a new micro surface texture's $c_{1micro}$, $c_{2micro}$, and $c_{3micro}$ values and processing conditions to the reference table whenever a new micro surface texture is first characterized.

The ray-tracing algorithm further requires specifying a macro surface texture in such a manner that allows calculation of reflectance angles for specific incident angles. One desirably form of defining macro surface texture is with a topography profile.

Calculate an array of surface reflectance values for a sample having the specific micro surface texture, macro surface texture and polymer composition using an array of parallel light rays illuminating the sample at a specific incident angle. The array of parallel light rays typically consists of 200 by 200 rays in rows spatially separated by 50 micrometers (μm) with each ray in a row spatially separated by 50 μm. Upon reaching the sample, each ray hits the sample at a different spot, and each spot can have a different height and slope due to the macro surface texture. Consider the local topography in combination with $c_{1micro}$, $c_{2micro}$, and $c_{3micro}$ values to determine how each ray is reflected from the sample. Limit the total amount of reflected light using classical Fresnel equations. Determine the amount of reflected light at each observation angle by summing the amount of light reflected from each ray at each observation angle. The result is an array of calculated surface reflectance values for the sample at a specific incident angle and multiple observation angles. Desirably, repeat the procedure for more than one incident angle and wavelength to determine a larger array of surface reflectance values. Generally, repeat the procedure for wavelengths of 400 nm, 450 nm, 500 nm, 550 nm, 600 nm, 650 nm, and 700 nm. Fit the array of surface reflectance values to Equation (1), (2) or (3) to determine $c_1$, $c_2$, and $C_3$ values for use in the modified Maya program. Fit a polynomial equation to $c_1$, $c_2$, and $c_3$ values obtained at different wavelengths to obtain a generalized expression for all wavelengths in the visible spectrum.

Use the modified Maya program to generate a virtual article and evaluate the appearance of the article in step 30. Desirably, generate a virtual article for more than one combination of illumination and viewing angles to determine how the article appears under different conditions.

If the virtual article does not have a desired appearance, proceed to step 35 and modify at least one virtual article parameter and regenerate the virtual article. Typically, modify colorant concentrations, which redefines the RGB values affecting internal color properties, and macro and micro surface texture, which modifies the surface reflectance property. Modification of the polymer composition is also possible, which affects both internal color properties (due to the polymer K, S and C values) and the surface reflectance properties, which is a function of the polymer composition's index of refraction. A skilled artisan will develop an ability to identify how each parameter affects an article's appearance, thereby minimizing the number of iterations necessary through step 35.

Once the evaluation in step 30 identifies a virtual article as having a desired appearance, the virtual article parameters used to define that virtual article are the final virtual article parameters. Step 40 involves identifying the fabrication parameters used to define the final virtual article parameters. The fabrication parameters from step 40 are suitable for fabricating a physical article, desirably a physical article having a similar, preferably substantially similar, appearance to the desired appearance. The fabrication parameters are generally, polymer composition, colorants and colorant compositions, macro and micro surface textures, article shape, and processing conditions. These parameters are directly known since they were used to determine the virtual article parameters. For example, use for processing conditions the processing conditions of the physical sample used to determine $c_{1micro}$, $c_{2micro}$, and $c_{3micro}$ values.

A skilled artisan can use the micro surface texture and macro surface texture parameters, in combination with the article shape parameter, to fabricate a suitable mold for molding plastic articles having the desired appearance. Fabrication of molds is an expensive endeavor. This is one area where the present invention saves time and money in the design and fabrication process. The present method uses fabrication parameters already known to be suitable for fabricating an article having a desired appearance to direct fabrication of a mold, even to the extent of defining micro surface texture. As a result, the present method reduces a need for molds for test fabrications as compared to design methods that do not utilize generation of a virtual article or identification of micro surface texture for an article having a desired appearance prior to mold fabrication.

If desired, the method may further comprise step 50, fabrication of a physical article from the desired polymer composition having an appearance similar, desirably substantially similar, to the desired appearance using the fabrication parameters from step 40. The fabrication parameters from step 40 may require slight modifications through trial fabrications in order to achieve an article having a similar, or substantially similar, appearance to the desired appearance. However, since the fabrication parameters have already defined a contribution to appearance from macro and micro surface texture, fewer trial fabrications are necessary with the present method than for other known methods (particularly those that only consider color contribution to appearance). In general, fewer than five, preferably fewer than three, more preferably fewer than two, most preferably no trial fabrications that result in redefining the fabrications parameters from step 40 are necessary in order to achieve a physical sample having a similar, preferably substantially similar appearance to the desired appearance.

Figure 3:
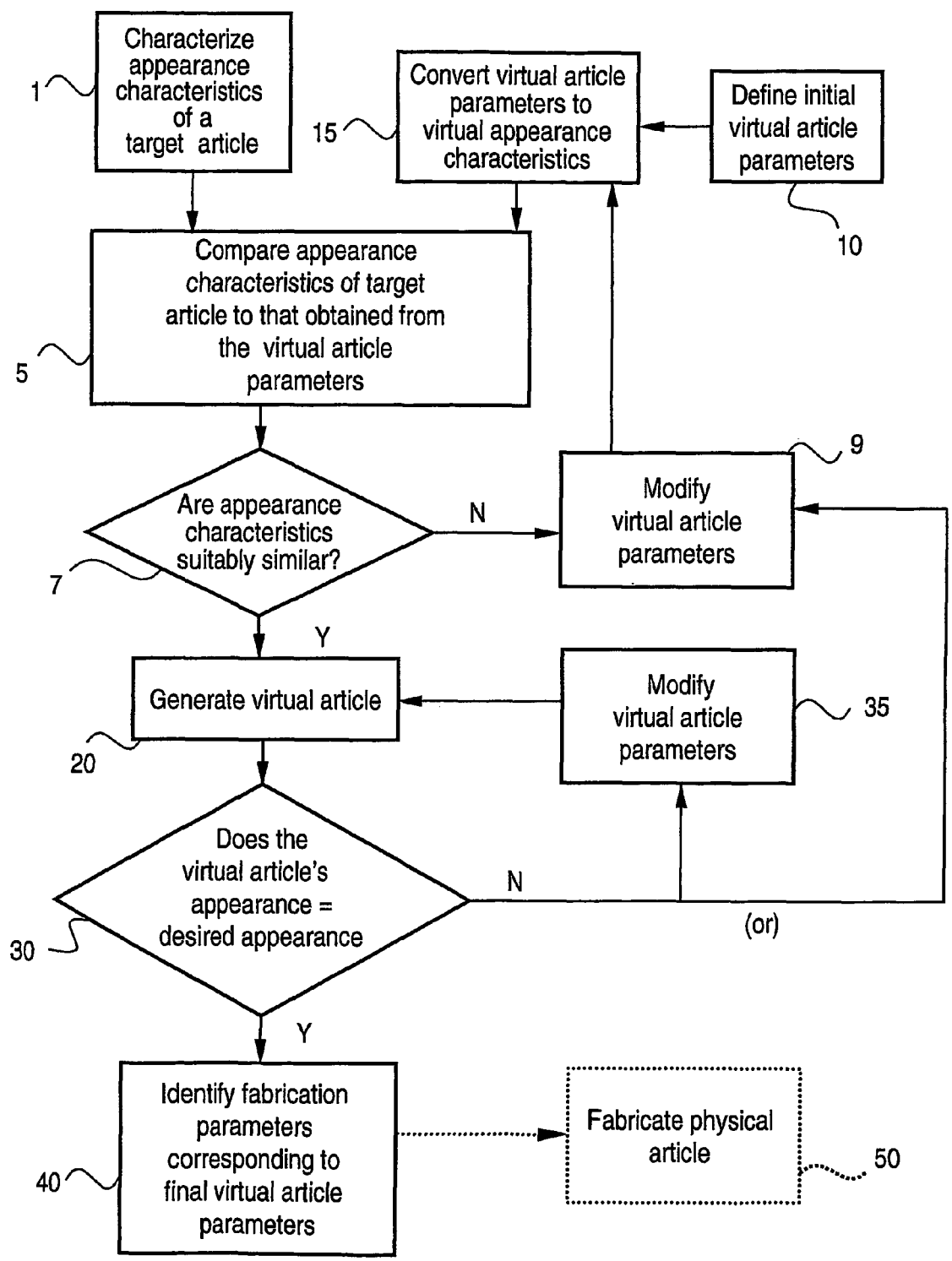
FIG. 3 illustrates a flow chart for a desirable variation of the second embodiment of the present invention.

A second embodiment of the present invention is a method for designing a plastic article having a desired appearance that is similar, preferably substantially similar, to the appearance of a target article (desired target appearance). FIG. 3 illustrates one variation of the second embodiment, which comprises the steps of the first embodiment in combination with additional steps.

Step 1 is characterization of a target appearance from a target article. The target article can be plastic or a material other than plastic, such as leather, metal, glass, or wood. Characterize the target article in such a way so as to capture its internal color properties and surface reflectance properties over a range of light wavelengths and more than one illumination angle, viewing angle, or more than one illumination angle and more than one viewing angle. Measuring an array of reflectance values at more than one combination of illumination and viewing angles is a convenient way to do such a characterization. A reflectance value provides a measure of reflected light relative to incident light at a specific wavelength, illumination angle, and viewing angle.

To characterize an article with an array of reflectance values illuminate the article with light containing multiple visible wavelengths of the visible spectrum (400–700 nm), preferably using white light that contains all the visible wavelengths. Using a spectrometer, measure the reflectance values for multiple visible wavelengths of reflected light at a specific illumination and viewing angle. Desirably, collect a reflectance value every 10 nm over the visible spectrum, resulting in 31 reflectance values at the specific illumination and viewing angles to establish a spectral array of reflectance values. It is desirable to collect a spectral array of reflectance values for as many combinations of illumination angles and viewing angles as possible in order to optimally characterize the article's appearance. Collect a spectral array of reflectance values for at least one other illumination angle, viewing angle, or both to establish an array of reflectance values, $R(\theta_o, \theta_i, \phi_i, \lambda)$, that characterizes the appearance of the target article.

As an alternative to measuring reflectance values, a client can provide reflectance values or reflectance values can be retrieved from a database of desirable reflectance values.

Accomplish steps 10 and 15 at any time relative to step 1. Step 10 is the same as in the first embodiment. In step 15, convert the virtual article parameters into a form comparable to that which is used to characterize the target article in step 1. For example, if step 1 results in an array of reflectance values then convert the virtual article parameters from step 10 into an array of reflectance values in step 15. Accomplish this conversion using Equation (4). Calculate $k(\theta_i \theta_o, \phi_o, \lambda)$ terms for Equation (4) using Equation (1), (2) or (3) and the ray tracing process described for the first embodiment. Calculate the internal color component using Equations (4)–(7) for the specific colorants and polymer composition desired and using the values specified for the remaining terms.

The array of reflectance values in step 1 and step 15 desirably have values at the same illumination angle(s), viewing angle(s), and wavelengths in order to facilitate comparing one to the other.

After completing steps 1 and 15, compare appearance characteristics of the virtual article to appearance characteristics of the target appearance in step 5 to evaluate how well they match. It is suitable, for example, to compare directly two arrays of reflectance values. It is also suitable to convert the reflectance values to L,a,b values and compare an array of L,a,b values for the target article to an array of L,a,b values for the virtual parameters. Fitting arrays of reflectance values allows for a more precise fit than fitting L,a,b values. However, converting reflectance values to L,a,b values reduces the number of terms that need to be compared (or fit) to one another without losing significant appearance information, thereby making the fit easier to do. CIE Publication NR 15.2, 1986 Vienna PO Box 169, Austria describes how to convert reflectance values to L,a,b values.

In step 7, evaluate whether or not the virtual article parameters have appearance characteristics acceptably similar to the appearance characteristics of the target appearance. If not, proceed to step 9, which requires modifying at least one virtual article parameter and then return to step 15. Define how close of a fit is acceptable in step 7 based on what type of fitting algorithm that you use. As an example, fit L,a,b values by minimizing a value ΔE for each value in the L,a,b value arrays:

$$\Delta E = \sqrt{\Delta L^2 + \Delta a^2 + \Delta b^2}$$

wherein: $\Delta L = L_{vp} - L_{target}$; $\Delta a = a_{vp} - a_{target}$; $\Delta b = b_{vp} - b_{target}$; $L_{vp}$, $a_{vp}$, and $b_{vp}$ are the L,a,b values for the virtual parameter array; and $L_{target}$, $a_{target}$, and $b_{target}$ are the L,a,b values for the target article array.

Upon reaching an acceptable agreement in step 7 between target article appearance characteristics and the virtual article parameter's appearance characteristics proceed to step 20 to generate a virtual article. Steps 20, 30, 40, and 50 are similar to those in the first embodiment. From step 20 proceed to step 30 to evaluate the appearance of the virtual article. If the appearance is a desired appearance, proceed to step 40 and, optionally, step 50.

If, in step 30, the appearance is not a desired appearance, proceed either to step 35 or step 9. Steps 35 and 9 are identical except in what step they precede. They are both similar to step 35 in the first embodiment. Step 9 allows for modification of at least one virtual article parameter and re-initiates a fit of the virtual article appearance to the appearance characteristics of the desired target appearance by going back to step 15. Therefore, going to step 9 reinitiates a fit of virtual appearance characteristics to target article appearance characteristics. Going from step 30 to step 9 is particularly desirable when the appearance of the virtual article from step 20 is extremely different from that of the target article and an appearance similar, or substantially similar to the target article is still desired. As a user gains experience, they will be able to recognize what constitutes an extremely different appearance.

If, however, the appearance of the virtual article is nearly similar to the desired target appearance, proceed from step 30 to step 35. Additionally, if a user wishes to intentionally design an article having a desired appearance that differs from the desired target appearance, proceed from step 30 to step 35. In step 35, change at least one virtual article parameter. From step 35 proceed to step 20 and generate a virtual image from the modified virtual article parameters. Proceed through steps 20, 30, and either 9 or 35 until step 20 generates a virtual article having a desired appearance. Upon generating a virtual article having a desired appearance, proceed to step 40 and, optionally, step 50.

Optionally, include steps in the second embodiment that identify initial virtual article parameters that are already similar to the target article. For example, obtaining and using a topography profile of the target article as a texture profile in the initial virtual article parameters can facilitate fitting of the virtual article appearance characteristics to the target article characteristics in step 5. Obtain a topography profile of a target article by known topography profile scanning methods.

While the present application illustrates specific ways of carrying out each step within this invention, a skilled artisan recognizes that there can be many ways to carry out any given step. The present invention is not limited to the specific ways of carrying out each step disclosed herein.

The present invention serves as a method to design plastic articles having a desired appearance while minimizing a need to fabricate multiple physical articles during the designing method.

What is claimed is:

1. A method for designing a plastic article comprising the steps:
    a) determining a set of virtual article parameters for an article from fabrication parameters; said fabrication parameters including:
        (i) a topography profile of a surface macro texture; and
        (ii) $c_{1micro}$, $c_{2micro}$, and $c_{3micro}$ values defining a micro texture for a known physical sample;
    b) using the set of virtual article parameters, generating a virtual article with sufficient appearance detail to reveal the article's internal color and surface reflectance components, including appearance due to micro and macro surface textures, under more than one combination of illumination an viewing angles;
    c) modifying at least one virtual article parameter in the set of virtual article parameters, while defining macro surface texture with topography profiles of known surfaces and surface micro texture with $c_{1micro}$, $c_{2micro}$, and $c_{3micro}$ values of known physical samples, until obtaining a final set of virtual article parameters that produce a virtual article that has a desired appearance;

d) determining fabrication parameters suitable for fabricating a physical article from the final set of virtual article parameters, said fabrication parameters including the topography profile and $c_{1micro}$, $c_{2micro}$, and $c_{3micro}$ values from the final set of virtual article parameters; and e) fabricating a physical article using the fabrication parameters from step (d);

wherein $c_{1micro}$, $c_{2micro}$, and $c_{3micro}$ values dictate a micro surface texture contribution to reflectance properties off from a surface of an article made of a polymer composition.

2. The method of claim 1, wherein the virtual article is an image on a computer monitor screen.

3. The method of claim 1, wherein step (a) comprises calculating an internal color component for the virtual article using absorption coefficients, scattering coefficients and concentration values for a specific polymer composition containing specific colorants.

4. The method of claim 1, wherein step (a) comprises calculating the surface reflectance components using $c_1$, $c_2$, and $c_3$ values and an equation selected from a group consisting of Equations (1), (2) and (3):

$$k(\theta_i, \theta_o, \varphi_o, \lambda) = k_F(\theta_i, \lambda)[c_1(\lambda) + c_2(\lambda)\exp(-f(\theta_i, \theta_o, \varphi_o)^2/c_3(\lambda))] \quad (1)$$

$$k(\theta_i, \theta_o, \varphi_o, \lambda) = \frac{c_1(\lambda) k_F(\theta_i, \lambda)}{(1 + c_2^2(\lambda) f(\theta_i, \theta_o, \varphi_o))^{c_3(\lambda)/2}} \quad (2)$$

$$k(\theta_i, \theta_o, \varphi_o, \lambda) = k_F(\theta_i, \lambda) \left[ \frac{c_1(\lambda)}{1 + f(\theta_i, \theta_o, \varphi_o)} + \frac{c_2(\lambda)}{(1 + f(\theta_i, \theta_o, \varphi_o))^2} + \frac{c_3(\lambda)}{(1 + f(\theta_i, \theta_o, \varphi_o))^3} \right] \quad (3)$$

where:

$$f(\theta_i, \theta_o, \varphi_o) = \sin^2(\varphi_o)\sin^2(\theta_o) + (\sin(\theta_i) - \cos(\varphi_o)\sin(\theta_o))^2 + (\cos(\theta_i) - \cos(\theta_o))^2;$$

and $$k_F(\theta_i, \lambda) = \frac{1}{2}\left( \left[ \frac{\cos(\theta_i) - \sqrt{n_r^2 - \sin^2(\theta_i)}}{\cos(\theta_i) - \sqrt{n_r^2 - \sin^2(\theta_i)}} \right]^2 + \left[ \frac{n_r^2\cos(\theta_i) - \sqrt{n_r^2 - \sin^2(\theta_i)}}{n_r^2\cos(\theta_i) - \sqrt{n_r^2 - \sin^2(\theta_i)}} \right]^2 \right)$$

and wherein $c_1$, $c_2$, and $c_3$ values dictate reflectance properties off from a surface of an article made of a polymer composition.

5. The method of claim 4, wherein a ray-tracing algorithm is used to determine $c_1$, $c_2$, and $c_3$ values.

6. The method of claim 1, wherein fabricating a physical article comprises molding a plastic article.

7. The method of claim 1, further comprising at least one step prior to step (a) for characterizing the appearance of a target article having a target appearance and modifying the set of virtual article parameters until they correspond to an article having substantially similar appearance characteristics to the target article.

8. The method of claim 7, wherein the similarity between appearance characteristics of the target article and appearance characteristics of the set of virtual article parameters is evaluated by comparing an array of reflectance values for the target article to an array of reflectance values of the virtual article parameters.

9. The method of claim 7, wherein the similarity between appearance characteristics of the target article and appearance characteristics of the set of virtual article parameters are evaluated by comparing to an array of L,a,b values for the target article to an array of L,a,b values of the virtual article; wherein L,a,b values are absolute color space coordinates.

10. The method of claim 7, wherein the desired appearance in step (c) is the same as the target appearance.

11. The method of claim 7, wherein the desired appearance in step (c) is different from the target appearance.

12. The method of claim 1, wherein the physical article is a mold for molding plastic articles.

13. The method of claim 1, wherein the physical article is made from a polymer composition.

* * * * *